United States Patent
Nakada

(10) Patent No.: US 11,522,641 B2
(45) Date of Patent: Dec. 6, 2022

(54) DATA TRANSMISSION SYSTEM FOR MULTIPLEXING A PLURALITY OF PIECES OF DATA IN A LAYERED DIVISION MULTIPLEXING (LDM) METHOD AND TRANSMITTING MULTIPLEXED DATA, RECEPTION DEVICE USED IN THE DATA TRANSMISSION SYSTEM, AND DATA TRANSMISSION METHOD THEREFOR

(71) Applicant: HITACHI KOKUSAI ELECTRIC INC., Tokyo (JP)

(72) Inventor: Tatsuhiro Nakada, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/610,287

(22) PCT Filed: Apr. 16, 2020

(86) PCT No.: PCT/JP2020/016719
§ 371 (c)(1),
(2) Date: Nov. 10, 2021

(87) PCT Pub. No.: WO2020/235276
PCT Pub. Date: Nov. 26, 2020

(65) Prior Publication Data
US 2022/0216942 A1 Jul. 7, 2022

(30) Foreign Application Priority Data
May 22, 2019 (JP) .............................. JP2019-095635

(51) Int. Cl.
*H04L 1/00* (2006.01)
*H04L 27/00* (2006.01)
*H04L 27/26* (2006.01)

(52) U.S. Cl.
CPC .......... *H04L 1/0071* (2013.01); *H04L 1/0041* (2013.01); *H04L 1/0057* (2013.01); *H04L 27/2602* (2013.01)

(58) Field of Classification Search
CPC ... H04L 1/0071; H04L 1/0041; H04L 1/0057; H04L 27/2602; H03M 13/00
See application file for complete search history.

(56) References Cited

U.S. PATENT DOCUMENTS

2016/0226689 A1* 8/2016 Kim .................. H04L 12/18
2016/0241365 A1* 8/2016 Bae .................. H04L 27/2607
(Continued)

FOREIGN PATENT DOCUMENTS

| JP | 2018-511188 A | 4/2018 |
| JP | 2018-107700 A | 7/2018 |
| WO | WO2017-051712 A1 | 3/2017 |

OTHER PUBLICATIONS

International Search Report dated Jul. 21, 2020.
(Continued)

*Primary Examiner* — Justin R Knapp
(74) *Attorney, Agent, or Firm* — Bacon & Thomas PLLC

(57) ABSTRACT

[Problem] To propose a technology capable of appropriately demodulating, in a receiving device, a plurality of pieces of data multiplexed through the quasi-synchronous LDM method. [Solution] A transmission device generates a UL modulated signal by using an IFFT process of $N_{UL}$ points, generates an LL modulated signal by using an IFFT process of $N_{LL}$ points different from the $N_{UL}$ points, and transmits signals obtained by timing-adjusting the modulated signals such that the start timings thereof coincide with each other in a predetermined cycle, and combining the timing-adjusted signals at a predetermined power ratio. In addition, the receiving device performs an $N_{UL}$ point FFT process on the reception signal from the transmitting device, reproduces (Continued)

UL and generates UL reception replica, on the basis of the result, and performs an $N_{LL}$ point FFT process on a signal obtained by subtracting the UL reception replica from the reception signal, and reproduces LL on the basis of the result.

8 Claims, 5 Drawing Sheets

(56) References Cited

U.S. PATENT DOCUMENTS

| | | | |
|---|---|---|---|
| 2016/0373221 A1* | 12/2016 | Michael | H04L 5/005 |
| 2018/0192254 A1 | 7/2018 | Lee et al. | |
| 2018/0270829 A1 | 9/2018 | Matsumura et al. | |
| 2019/0116079 A1* | 4/2019 | Simon | H04J 13/0059 |

OTHER PUBLICATIONS

Akihiko Sato, and 11 others, "A Study on Applying Layered Division Multiplexing for Next Generation Digital Terrestrial Broadcasting," Technical Report of Conference for Video Information Media, vol. 41, No. 6, BCT2017-34, pp. 45-48, Feb. 2017.

Hiromasa Okada, and 6 others, "A Consideration on Improvement of Various Problems in Application of LDM to DTTB: Next Broadcasting System Service Area Expansion Method and Consideration on synchronization method," Technical Report of Conference for Video Information Media, vol. 42, No. 28, BCT2018-76, pp. 13-16, Sep. 2018.

Noriyuki Shirai, and 4 others,"A study on Bandwidth Extension for the Proposed Specification of the Next Generation Terrestrial Broadcasting" Technical Report of Conference for Video Information Media, vol. 42, No. 11, BCT2018-48, pp. 43-46, Mar. 2018.

* cited by examiner

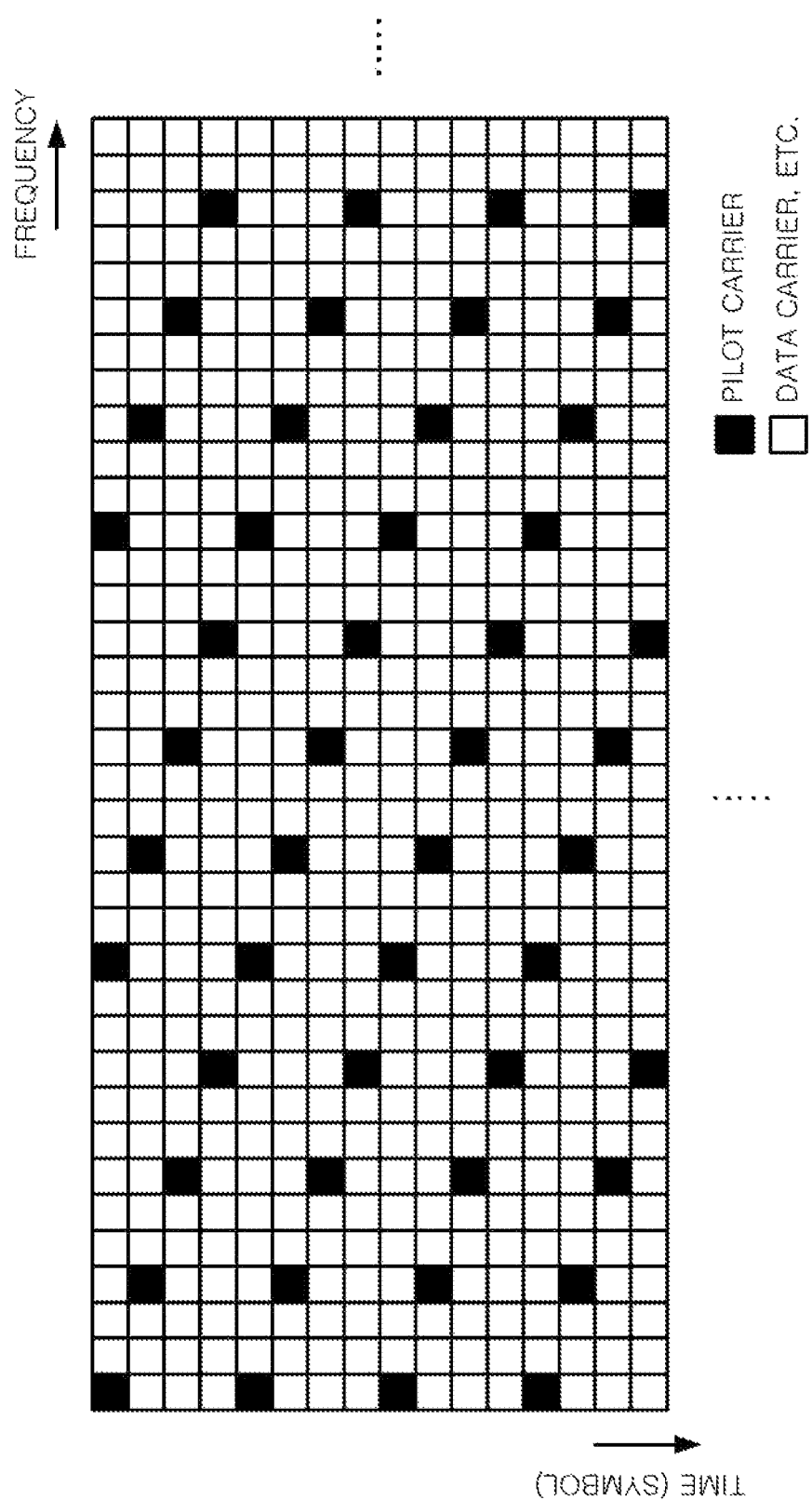

US 11,522,641 B2

DATA TRANSMISSION SYSTEM FOR MULTIPLEXING A PLURALITY OF PIECES OF DATA IN A LAYERED DIVISION MULTIPLEXING (LDM) METHOD AND TRANSMITTING MULTIPLEXED DATA, RECEPTION DEVICE USED IN THE DATA TRANSMISSION SYSTEM, AND DATA TRANSMISSION METHOD THEREFOR

TECHNICAL FIELD

The present invention relates to a data transmission system for multiplexing a plurality of pieces of data in a layered division multiplexing (LDM) method and transmitting multiplexed data.

BACKGROUND

As part of the transition to next-generation terrestrial digital broadcasting, there has been research on a layered division multiplexing (LDM) method, which transmits broadcast waves in a type different from that of the current 2K (2K pixel) broadcasting by sharing a frequency and time. Non-Patent Document 1 proposes a method in which an upper layer (UL) and a lower layer (LL) are Orthogonal Frequency Division Multiplexing (OFDM)-modulated with the same number of Fast Fourier Transform (FFT) points, and the UL and LL are multiplexed at different levels on the same subcarrier. Further, Non-Patent Document 2 proposes a method in which a UL and a LL are OFDM-modulated with different FFT points and multiplexed in the time domain. Hereinafter, the former method (Non-Patent Document 1) is referred to as 'synchronous LDM', and the latter method (Non-Patent Document 2) is referred to as 'quasi-synchronous LDM'.

In the quasi-synchronous LDM, as shown in FIG. 3, for a UL, an effective symbol is generated using 8192 FFT points, and a guard interval of 1024 samples is added to generate an OFDM symbol of 9216 samples. On the other hand, for an LL, an effective symbol is generated using 32768 FFT points and a guard interval of 1024 samples equal to that of the UL is added to generate an OFDM symbol of 33792 samples. In this case, the UL symbols and the LL symbols have an integer ratio of 11:3 which is the least common multiple, and the starting timings coincide with each other in a predetermined period.

As described above, in the quasi-synchronous LDM, the UL and LL are set to have the same guard interval length, and the LL is set to have an effective symbol length longer than that of the UL so that delay time tolerances of reflected waves become identical, and the bit rate of the LL is improved as compared to that of the UL. Based on such a feature, Non-Patent Document 2 proposes applying a quasi-synchronous LDM to a next-generation terrestrial digital system.

PRIOR ART DOCUMENTS

Non-Patent Documents

Non-Patent Document 1: Akihiko Sato, and 11 others, "A Study on Applying Layered Division Multiplexing for Next Generation Digital Terrestrial Broadcasting," Technical Report of Conference for Video Information Media, vol. 41, No. 6, BCT2017-34, pp. 45-48, February 2017
Non-Patent Document 2: Hiromasa Okada, and 6 others, "A Consideration on Improvement of Various Problems in Application of LDM to DTTB: Next Broadcasting System Service Area Expansion Method and Consideration on synchronization method," Technical Report of Conference for Video Information Media, vol. 42, No. 28, BCT2018-76, pp. 13-16, September 2018
Non-Patent Document 3: Noriyuki Shirai, and 4 others, "A study on Bandwidth Extension for the Proposed Specification of the Next Generation Terrestrial Broadcasting" Technical Report of Conference for Video Information Media, vol. 42, No. 11, BCT2018-48, pp. 43-46, March 2018

SUMMARY

Problems to Be Resolved by the Invention

In the synchronous layered division multiplexing (LDM), for a reception signal, the same Fast Fourier Transform (FFT) time window is provided for both an upper layer (UL) and a lower layer (LL), and FFT is performed on the signal within the FFT time window, and thus each subcarrier is converted into a frequency domain signal while maintaining the orthogonal relationship. However, in the quasi-synchronous LDM, since different numbers of FFT points are used for the UL and the LL, the orthogonal relationship between subcarriers is broken, and demodulation cannot be performed in the same manner as in the synchronous LDM. In addition, while Non-Patent Document 2 describes the efficiency and characteristics of the quasi-synchronous LDM, it fails to specifically disclose the demodulation method of the quasi-synchronous LDM.

The present invention is directed to providing a technique for appropriately demodulating a plurality of pieces of data multiplexed by a quasi-synchronous LDM method in a reception device.

Means of Solving the Problem

In order to achieve the above object, in the present invention, a data transmission system is configured as follows.

That is, a data transmission system for multiplexing a plurality of pieces of data in a layered division multiplexing (LDM) method and transmitting multiplexed data is characterized by including: a transmission device configured to generate a modulated signal of first data using Inverse Fast Fourier Transform (IFFT) processing of a first number of points, generate a modulated signal of second data using IFFT processing of a second number of points different from the first number of points, and transmit a composite of these modulated signals which are adjusted in timing so that their start timings match at a predetermined cycle; and a reception device configured to perform Fast Fourier Transform (FFT) processing of the first number of points on the signal received from the transmission device, reproduce the first data on the basis of a result of the FFT processing while generating a reception replica of the modulated signal of the first data, perform FFT processing of the second number of points on a signal obtained by subtracting the reception replica from the received signal, and reproduce the second data on the basis of a result of the FFT processing.

Here, the transmission device may perform first error correction encoding processing and interleaving processing on the first data, perform second error correction encoding processing on a result of the interleaving processing, and then perform the IFFT processing of the first number of points to generate the modulated signal of the first data; and the reception device may perform first error correction processing corresponding to the first error correction encoding processing and deinterleaving processing corresponding to the interleaving processing on the basis of a result of the FFT processing of the first number of points to reproduce the first data, while performing second error correction processing corresponding to the second error correction encoding processing and IFFT processing of the first number of points on the basis of the result of the FFT processing of the first number of points to generate the reception replica.

Also, the reception device may estimate a transmission path characteristic between the transmission device and the reception device using a result of the second error correction processing, and generate the reception replica using the estimated transmission path characteristic.

Also, the reception device may reproduce at least one of the first data or the second data using the estimated transmission path characteristic.

The reception device may estimate the transmission path characteristic from the first number of points, and use a result that is rate-converted from the estimated transmission path characteristic based on the second number of points to reproduce the second data.

Also, the transmission device may allocate a result of the second error correction encoding processing to an auxiliary path (AC) carrier provided as a spare carrier in a frequency domain for transmission of the first data and the second data, or to an extended area added to at least one side frequency band of the frequency domain.

Effect of the Invention

In accordance with the present invention, it is possible to appropriately demodulate a plurality of pieces of data multiplexed by a quasi-synchronous layered division multiplexing (LDM) method in a reception device.

BRIEF DESCRIPTION OF THE DRAWINGS

FIG. 5 is a diagram illustrating scattered arrangement of pilot symbols.

DETAILED DESCRIPTION

Hereinafter, a data transmission system according to embodiments of the present invention will be described with reference to the drawings.

Figure 1:
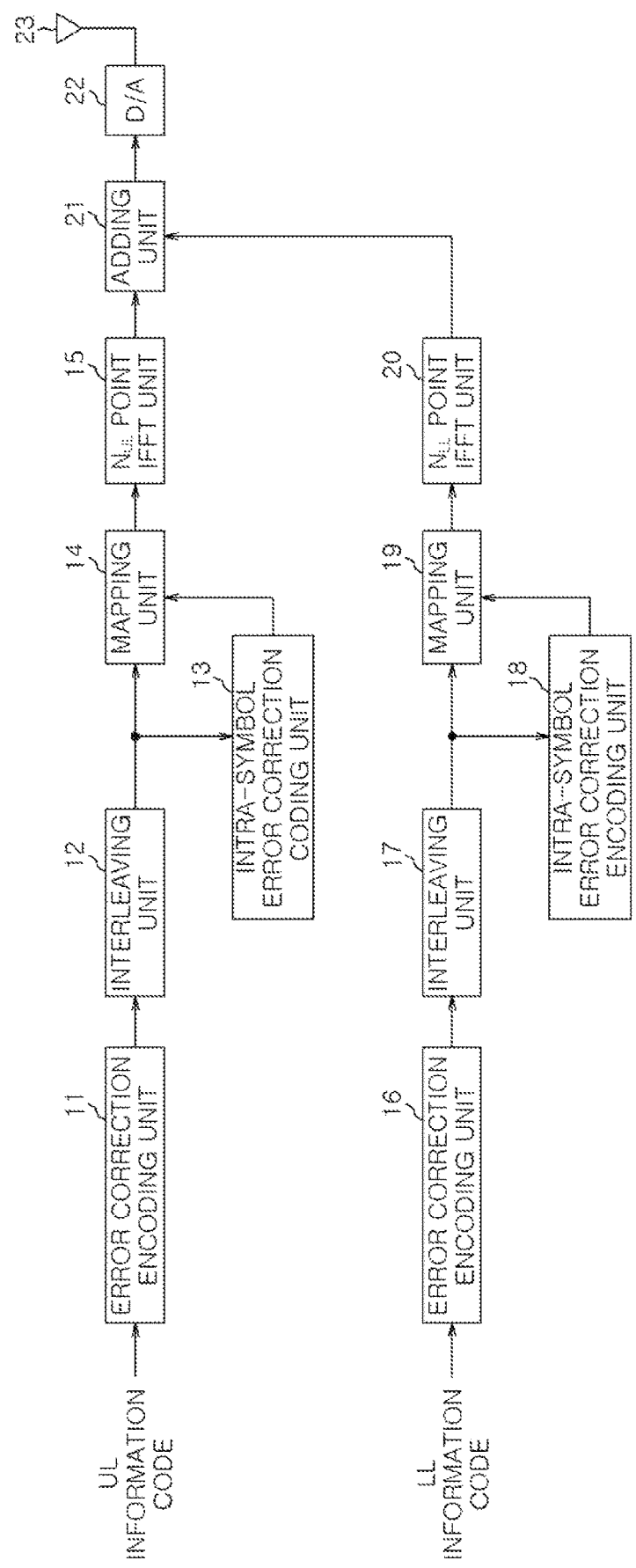
FIG. 1 is a block diagram illustrating a configuration of a transmission device in a data transmission system according to an embodiment of the present invention.
Figure 2:
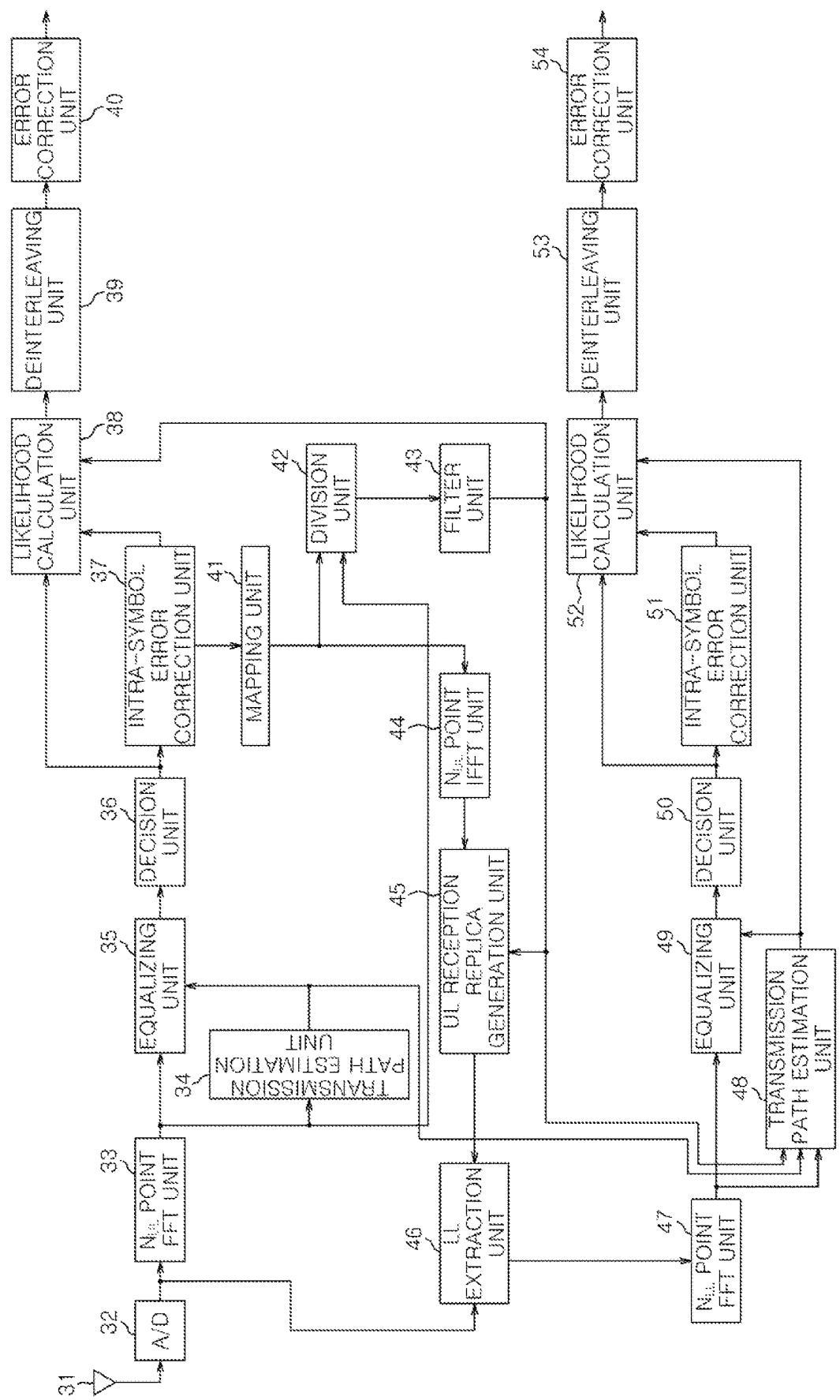
FIG. 2 is a diagram illustrating a configuration of a reception device in a data transmission system according to an embodiment of the present invention.

FIG. 1 is a block diagram illustrating a configuration of a transmission device in a data transmission system according to an embodiment of the present invention, and FIG. 2 is a diagram illustrating a configuration of a reception device in the data transmission system. The data transmission system according to the embodiment is a quasi-synchronous layered division multiplexing (LDM) transmission system in which an upper layer (UL) and a lower layer (LL) are Orthogonal Frequency Division Multiplexing (OFDM)-modulated with different Fast Fourier Transform (FFT) points and multiplexed in the time domain and the result is transmitted.

Here, the data transmission system according to the embodiment of the present invention will be described based on a case in which wireless technology is used for a transmission path between the transmission device and the reception device, but wired technology may also be used for the transmission path between the transmission device and the reception device.

The transmission device includes an error correction encoding unit 11, an interleaving unit 12, an intra-symbol error correction encoding unit 13, a mapping unit 14, and a $N_{UL}$ point Inverse Fast Fourier Transform (IFFT) unit 15, an error correction encoding unit 16, an interleaving unit 17, an intra-symbol error correction encoding unit 18, a mapping unit 19, a $N_{LL}$ point IFFT unit 20, an adding unit 21, a digital-to-analog (D/A) conversion unit 22, and a transmission antenna 23.

The reception device includes a reception antenna 31, an Analog-to-Digital (A/D) conversion unit 32, a $N_{UL}$ point FFT unit 33, a transmission path estimation unit 34, an equalizing unit 35, a decision unit 36, an intra-symbol error correction unit 37, a likelihood calculation unit 38, a deinterleaving unit 39, an error correction unit 40, a mapping unit 41, a division unit 42, a filter unit 43, a $N_{UL}$ point IFFT unit 44, a UL reception replica generation unit 45, a LL extraction unit 46, an $N_{LL}$ point FFT unit 47, a transmission path estimation unit 48, an equalizing unit 49, a decision unit 50, an intra-symbol error correction unit 51, a likelihood calculation unit 52, a deinterleaving unit 53, and an error correction unit 54.

First, the operation of the transmission device shown in FIG. 1 will be described.

In the transmission device, an information code of a UL to be transmitted to the reception device is input to the error correction encoding unit 11 and is subjected to error correction encoding processing in the error correction encoding unit 11. Although the current terrestrial digital system (ARIB STD-B31) employs a convolutional code as an error correction code, the present invention is not limited thereto and may employ another error correction method such as a low-density parity check (LDPC) code or a turbo code.

A coded signal output from the error correction encoding unit 11 is interleaved in the interleaving unit 12 by randomly rearranging the order in the frequency domain, the time domain, and the bit domain constituting a subcarrier. The interleaving is used to mitigate burst errors. In the interleaving, longer range of rearrangement leads to higher improvement effect, but on the other hand, a delay occurs in order to return the rearranged information to the original order. In particular, the delay time by time interleaving is dominant. The output of the interleaving unit 12 is input to the intra-symbol error correction encoding unit 13 and the mapping unit 14. For example, in ARIB STD-B31, 4992 carriers are used as data subcarriers.

The intra-symbol error correction encoding unit 13 performs error correction encoding processing on data subcarriers in an OFDM symbol after the interleaving. In order to ensure compatibility with ARIB STD-B31, the intra-symbol error correction encoding unit 13 may preferably use a systematic code that uses the format of the data subcarrier signal without change and generates a new redundant code for error correction. The systematic code includes a Reed-Solomon (RS) code, a Bose-Chaudhuri-Hocquenghem (BCH) code, an LDPC code, and the like. The effect of intra-symbol error correction will be described below.

The mapping unit 14 receives the data subcarrier from the interleaving unit 12 and the redundant code for error correction from the intra-symbol error correction encoding unit 13 as inputs. The mapping unit 14 maps the data subcarrier from the interleaving unit 12 onto the I-Q complex plane using quadrature amplitude modulation (QAM), phase shift keying (PSK) or the like. In ARIB STD-B31, 16QAM, or 64QAM is employed.

In addition, the mapping unit 14 also performs mapping on the redundant code for error correction from the intra-symbol error correction encoding unit 13. In addition, the mapping unit 14 also performs mapping, such as binary phase shift keying (BPSK) on a pilot signal, whose amplitude and phase are already known, so that the transmission path characteristics are estimated by the reception device.

Figure 4A:
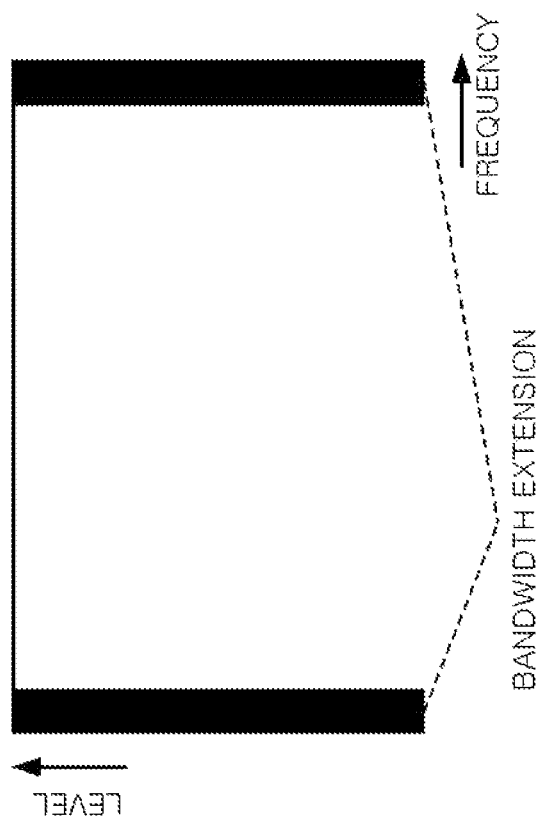
FIG. 4 is a diagram illustrating an example of assignment of a mapping result of a redundant code for intra-symbol error correction.
Figure 4B:
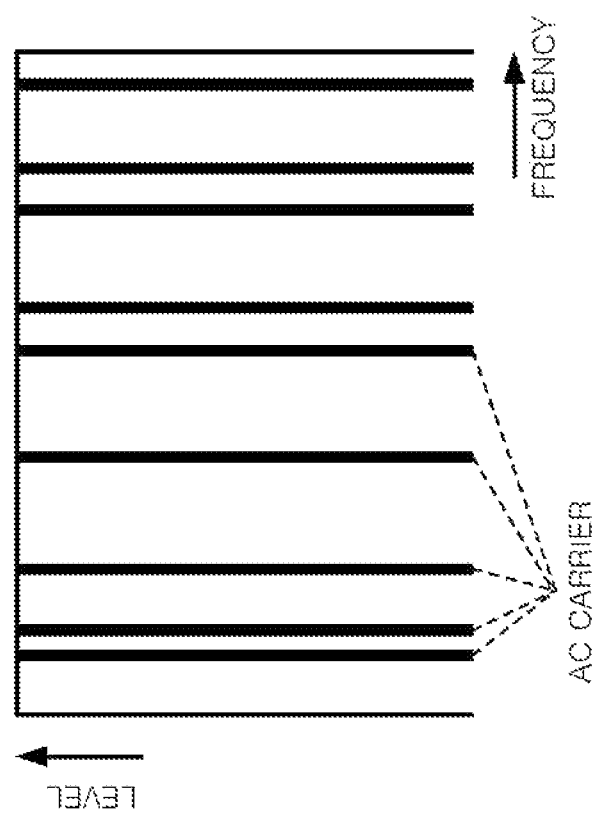

In ARIB STD-B31, the arrangement of pilot subcarriers and data subcarriers is standardized, and in order to comply with ARIB STD-B31, the arrangement of subcarriers need to be followed. Accordingly, in order to allocate the mapping result of the output (the redundant code for error correction) of the intra-symbol error correction encoding unit 13 in accordance with ARIB STD-B31, the mapping result is allocated to an auxiliary path (AC) carrier provided as a spare carrier as shown in FIG. 4A. Further, in Non-Patent Document 3, a proposal for extending the current bandwidth from 5.57 MHz to 5.83 MHz is provided. It may be possible, by using the newly expanded frequency domain, to allocate the mapping result of the output of the intra-symbol error correction encoding unit 13 while maintaining compatibility with the current ARIB STD-B31 (see FIG. 4B).

The IFFT unit 15 performs IFFT processing of $N_{UL}$ points on the result of mapping and subcarrier arrangement performed by the mapping unit 14 and cyclically copies the second half of the generated time signal to the beginning of the symbol to add a guard interval. As described above, so-called OFDM modulation is performed on the information code of the UL. In ARIB STD-B31, a $N_{UL}$ of 8192 and a guard interval length of 1024 are set.

The above processing is OFDM modulation processing for the information code of the UL, which is first data (e.g., broadcast data of 2K) among pieces of data transmitted to the reception device, but the same OFDM modulation processing is also performed on an information code of an LL, which is second data (e.g., broadcast data of 4K) different from the first data. Because the error correction encoding unit 16, the interleaving unit 17, the intra-symbol error correction encoding unit 18, the mapping unit 19, and the $N_{LL}$ point IFFT unit 20 for the information code of the LL perform the same processing as those of the functional units 11 to 15 for the information code, detailed descriptions thereof are omitted. In addition, for the information code of the LL, according to the proposal of Non-Patent Document 2, a case of using LDPC as an error correction method and $N_{LL}$=32768 is described.

According to the above-described processing, the modulated signals of the UL and the LL are generated.

Figure 3:
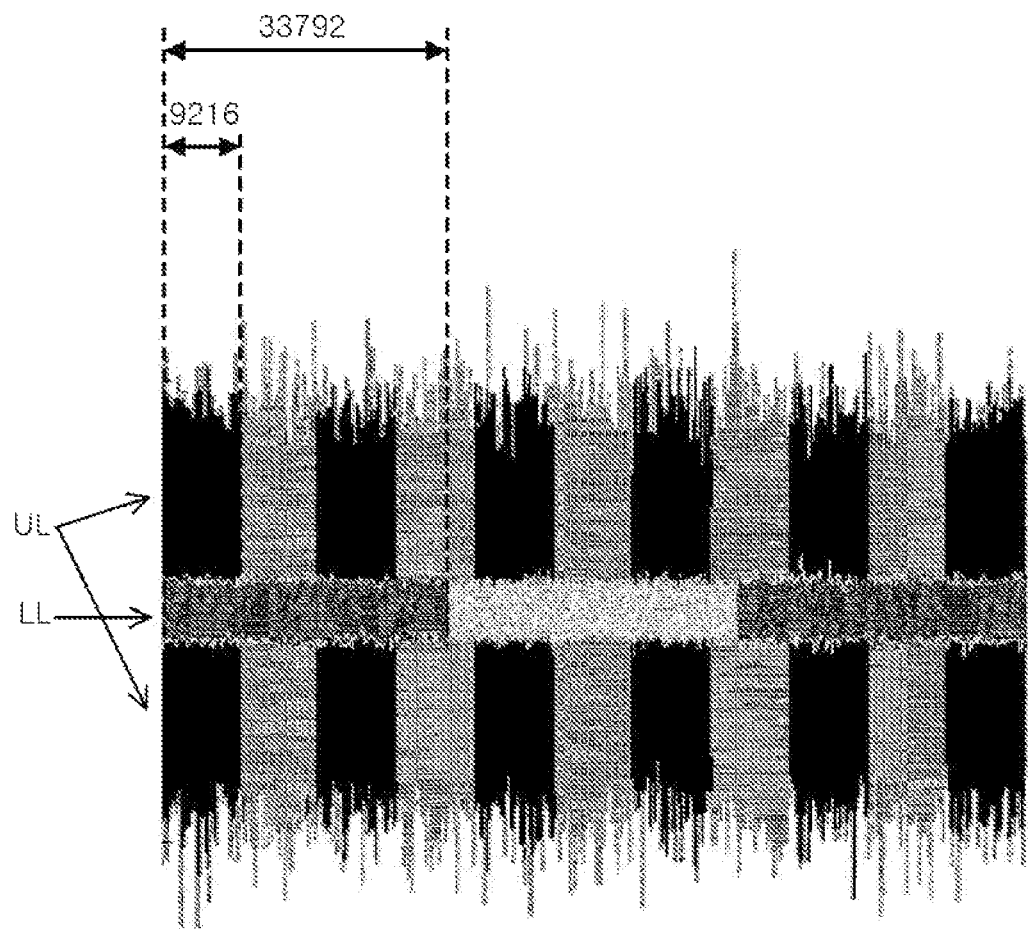
FIG. 3 is a diagram illustrating an example of a modulated signal of quasi-synchronous layered division multiplexing (LDM).

As described with reference to FIG. 3, the adding unit 21 sets the ratio of the number of symbols of the UL and the number of symbols of the LL to 11:3, performs timing-adjustment such that each of the start timings of the UL and the LL coincide with each other in a cycle corresponding to the ratio, and combines the time-adjusted modulated signals in a predetermined power ratio to thereby generate a quasi-synchronous LDM signal. Here, the combination ratio of the UL and the LL is defined by an injection level (IL) calculated by Equation 1 below.

$$IL = 10\log_{10}\left(\frac{UL \text{ power}}{LL \text{ power}}\right) \qquad \text{[Equation 1]}$$

The quasi-synchronized LDM signal generated from the adding unit 21 is converted into an analog signal by the D/A conversion unit 22, is frequency-converted to a transmission frequency, and then is transmitted from the transmission antenna 23.

Hereinafter, the operation of the reception device shown in FIG. 2 will be described.

In the reception device, the reception antenna 31 receives the signal transmitted from the transmission device, and the A/D conversion unit 32 performs frequency conversion on the received signal of the transmission frequency into the baseband frequency, while converting the analog signal to a digital signal.

The $N_{UL}$ point FFT unit 33 receives the digital signal from the A/D conversion unit 32, and configures an FFT time window having the length of the $N_{UL}$ for the received digital signal, and performs FFT processing of converting the time domain signal to a frequency domain signal in units of subcarriers. The FFT time window needs to be provided at a timing when inter-symbol interference due to reflected waves does not occur. The signal output from the $N_{UL}$ point FFT unit 33 is input to the transmission path estimation unit 34, the equalizing unit 35, and the division unit 42.

The transmission path estimation unit 34, as shown in FIG. 5, performs interpolation on pilots (scattered pilot: SP) scattered in the symbol (time) and the frequency in two-dimensional directions to estimate the transmission path characteristics between the transmission device and the reception device. In general, the interpolation processing may be performed using a two-dimensional filter. The passband width in the frequency direction of the two-dimensional filter corresponds to the length of the delay time of the reflected wave, which is estimated, and the passband width in the time direction corresponds to the time-variant frequency caused by transmission or the like.

In order to improve the estimation accuracy of the transmission path characteristics, there is a need to set the time and frequency fluctuation components of the transmission path to the passband width that falls within the passband of the two-dimensional filter, but in this case, the noise component may be increased. Therefore, the passband width of the two-dimensional filter is set to be as narrow as possible while making it possible to enable the transmission path characteristics to be estimated.

In a situation in which the LL signal is received through the quasi-synchronous LDM, the amount of noise mixed in the received signal is small. In general, the LL often operates as a lower level than the UL, and for example, IL=23 dB is set. In this case, when the required Carrier-to-Noise Ratio (CNR) of the LL is set to 20 dB, an overall CNR with respect to the UL level needs to be equal to or greater than 43 dB (23+20=43 dB) in order to correctly receive the LL.

As described above, since noise has a power significantly lower than that of the UL, the dominant degradation factor for the reception of the UL is the LL signal, not the noise. Since the LL signal functions as noise to the UL, in the example of IL=23 dB, the UL has a Carrier to Interference and Noise Ratio (CINR) of about 23 dB. Here, an interference (I) component of the CINR is the LL signal.

Referring again to the description on the transmission path estimation, the received pilot carrier has a CINR approximating IL [dB]. As will be described below, a major objective of the quasi-synchronous LDM is to improve the transmission path estimation accuracy. Therefore, when performing the transmission path estimation from a pilot signal having a CINR (CINR=IL), the passband width of the two-dimensional filter of the transmission path estimation unit 34 needs to be set as narrow as possible.

The equalizing unit 35, as shown in Equation 2 below, complex-divides the received subcarrier signal Y(ω) by a transmission path estimation result $\hat{H}_{(1)}(\omega)$ to calculate an estimated value $E_{UL}(\omega, t)$ of the transmission signal of the LL. Here, ω denotes a subcarrier number and t denotes a symbol number. In addition, (1) in $\hat{H}_{(1)}(\omega)$ denotes an ordinal number indicating the number of times the transmission path estimation result is calculated, that is, indicates that the result of the transmission path estimation unit 34 is a transmission path estimation result obtained for the first time.

$$E_{UL}(\omega, t) = \frac{Y(\omega, t)}{\hat{H}^{(1)}(\omega, t)}$$ [Equation 2]

The decision unit 36 decides on a region in which the equalization result $E_{UL}(\omega, t)$ by the equalizing unit 35 is located. This processing is generally referred to as a hard decision process. As described above, since the overall CNR is large in an environment in which the LL is received, the possibility of an error in the hard decision of the UL is low. However, a dip may occur in the spectrum due to mixing of reflected waves or the like, and an error may occur in the UL hard decision result of a subcarrier located in the spectrum dip.

Therefore, the intra-symbol error correction unit 37 performs error correction processing on such a slight error. The error correction unit 40, which will be described below, has a higher error correction capability than that of the intra-symbol error correction unit 37 but causes a delay time due to passing through the deinterleaving unit 39. In addition, in order that the result of the error correction unit 40 is used by the mapping unit 41 at a later stage, processing equivalent to that of the interleaving unit 12 on the transmission side needs to be provided, and the amount of hardware is increased. Accordingly, the providing of the intra-symbol error correction unit 37 has a benefit of correcting small errors occurring in a satisfactory CNR reception condition with a low delay and a small amount of hardware without passing through the deinterleaving unit 39.

The LL transmission signal estimated by the intra-symbol error correction unit 37 is subjected to the same mapping processing as that of the mapping unit 14 of the transmission device, which is shown in FIG. 1, by the mapping unit 41. The remapping result is expressed as $\hat{X}_{UL}(\omega, t)$.

The division unit 42 complex-divides the reception subcarrier signal Y(ω, t) from the $N_{UL}$ point FFT unit 33 by the remapping signal $\hat{H}^{(1)}(\omega)$ from the mapping unit 41. The reception subcarrier signal Y(ω, t) is expressed as a product of a transmission signal X(ω, t)=XUL(ω, t)+XLL(ω, t) and a transmission path characteristic H(ω, t), as shown in Equation 3 below. However, in Equation 3 below, the noise component is omitted under the assumption of a satisfactory CNR environment.

Y(ω,t)=H(ω,t)X(ω,t)

Y(ω,t)=H(ω;t)X$_{UL}$(ω,t)+H(ω,t)X$_{LL}$(ω,t) [Equation 3]

In the division unit 42, the reception subcarrier signal Y(ω, t) shown in Equation 3 above is processed by Equation 4 below.

$$\hat{H}^{(2)}(\omega, t) = \frac{Y(\omega, t)}{\hat{X}_{UL}(\omega, t)}$$ [Equation 4]

Supposing that the error of the UL is completely corrected by the intra-symbol error correction unit 37, an equation of $\hat{X}_{UL}(\omega, t) = X_{UL}(\omega, t)$ is established. Accordingly, Equation 4 is expanded to Equation 5 below. Equation 5 below expresses the transmission path estimation result obtained for the second time. The second term inside the parentheses of Equation 5 below remains as a transmission path estimation error, and has a power of −IL[dB]. The result of the division unit 42 is input to the filter unit 43.

$$\hat{H}^{(2)}(\omega, t) = \frac{Y(\omega, t)}{X_{UL}(\omega, t)}$$ [Equation 5]
$$= \frac{H(\omega, t)X_{UL}(\omega, t) + H(\omega, t)X_{LL}(\omega, t)}{X_{UL}(\omega, t)}$$
$$= H(\omega, t)\left(1 + \frac{X_{LL}(\omega, t)}{X_{UL}(\omega, t)}\right)$$

The filter unit 43 has a two-dimensional filter similarly to the transmission path estimation unit 34, and the passband width is set to be as narrow as possible while making it possible to estimate the transmission path characteristics while reducing the second term in the parenthesis. Equation 6 below shows the transmission path estimation result obtained for the second time after the processing by the filter unit 43. In Equation 6 below, FIL$_{ω,t}$[ ] is a function that performs filtering in a two-dimensional area with a frequency ω and a time t.

$\hat{H}^{(3)}(\omega,t) = FIL_{\omega,t}[\hat{H}^{(2)}(\omega,t)]$ [Equation 6]

A major difference between the filter unit 43 and the transmission path estimation unit 34 is that, in the transmission path estimation unit 34, the only signal usable for transmission path estimation is a pilot carrier, which is a known signal, while in the filter unit 43, a data carrier also functions as a known signal. For this reason, the filter unit 43 has a larger amount of signals usable for the transmission path estimation compared to the transmission path estimation unit 34. For example, when the amount of known signals is increased twelve times, the transmission path estimation accuracy is improved about 10.8 dB.

The above description relates to a structure that provides high-precision transmission path estimation suitable for quasi-synchronous LDM.

Hereinafter, a process of calculating a replica of the UL reception signal (hereinafter referred to as an 'UL reception replica') using the transmission path estimation result a $\hat{H}^{(3)}(\omega, t)$ output from the filter unit 43, and extracting an LL signal by subtracting the UL reception replica from the reception signal will be described.

The remapping signal output from the mapping unit 41 is subjected to IFFT processing by the $N_{UL}$ point IFFT unit 44 that converts a signal in the frequency domain into a signal in the time domain. When there is no error in the UL hard decision result, the $N_{UL}$ point IFFT unit 44 generates the same signal as that of the IFFT unit 15 of the transmission device shown in FIG. 1.

The UL reception replica generation unit 45 generates the UL reception replica on the basis of the time domain signal of the UL and the transmission path estimation result $\hat{H}^{(3)}(\omega, t)$ from the filter unit 43. That is, the UL reception replica generation unit 45 reproduces a time domain reception signal of the UL without the LL signal. As for the method of generating the UL reception replica, various methods may be considered, but the method is not described in the present invention.

The LL extraction unit 46 extracts the LL signal by subtracting the UL reception replica from the reception signal in which the UL and LL are mixed.

Hereinafter, demodulation of the LL signal will be described.

The $N_{LL}$ point FFT unit 47 performs $N_{LL}$ point FFT processing on the LL signal extracted by the LL extraction unit 46, converts the time domain signal into a frequency domain signal in units of subcarriers, and outputs an LL reception subcarrier signal.

The transmission path estimation unit 48, when a pilot is inserted into the LL signal, performs transmission path estimation based on a reception pilot signal of the LL signal. The processing is the same as that of the transmission path estimation unit 34.

Here, since the transmission path characteristics of the UL and the LL are the same, the UL path estimation result may be used as the LL path estimation result. In this case, since there is no need to insert a pilot into the LL signal, the bit rate may be improved. In addition, as the UL transmission path estimation result, the output of the transmission path estimation unit 34 or the output of the filter unit 43 may be used. In this case, since the number of FFT points is different between the UL and the LL, it is necessary to perform rate conversion from $N_{UL}$ points to $N_{LL}$ points. The method of rate conversion includes interpolation to increase the rate, decimation to decrease the rate, and the like. In addition, interpolation and decimation may be used in combination. Various well-known methods may be used for the rate conversion, and detailed descriptions thereof are omitted.

The equalizing unit 49, similar to the equalizing unit 35, estimates the transmission signal of the LL on the basis of the LL reception subcarrier signal from the $N_{LL}$ point FFT unit 47 and the transmission path estimation result from the transmission path estimation unit 48. The decision unit 50, similar to the decision unit 36, makes a hard decision on the estimated value of the transmission signal of the LL.

The intra-symbol error correction unit 51 performs error correction on the hard decision result of the LL. The intra-symbol error correction unit 51 has a difference from the intra-symbol error correction unit 37 for the UL in that the UL has a very satisfactory CNR, but for the LL, the CNR is lowered by as much as IL. Therefore, in such a low CNR environment, a simple error correction hardly exhibits its capability.

Hereafter, the significance of the intra-symbol error correction unit 51 for the LL will be described. In Non-Patent Document 2, it is proposed to apply quasi-synchronous LDM to the transition stage from 2K broadcasting to 4K broadcasting. At the stage where the transition from 2K broadcasting to 4K broadcasting is completed and 2K broadcasting is completely finished, the UL signal disappears and there is only the LL signal. At the point, the LL signal power also increases, and the reception CNR of the LL is also in a satisfactory state. In the next next-generation transition stage after the transition from 2K broadcasting to 4K broadcasting is completed, it is also being considered to implement 8K broadcasting through LDM in a layer below the LL signal, and similar to the transition from 2K broadcasting to 4K broadcasting, LDM is expected to be performed in the transition from 4K broadcasting to 8K broadcasting. In such a situation, the intra-symbol error correction unit 51 for the LL may exhibit the same effect as that of the intra-symbol error correction unit 37 for the UL.

Finally, the likelihood calculation units 38 and 52, the deinterleaving units 39 and 53, and the error correction units 40 and 54 for the UL and LL, respectively, will be described. The functional units 38 to 40 for the UL and the functional units 52 to 54 for the LL perform the same processing as each other.

The likelihood calculation units 38 and 52, based on the equalization result, calculate a log likelihood ratio (LLR) corresponding to each bit from the distance between the equalization result and an abnormal reception point. Here, the LLR may be preferably set to a size proportional to the CNR for each subcarrier, and accordingly, the power of the transmission path estimation result for each subcarrier is used. In addition, as for a bit that is correctable through intra-symbol error correction, the size of the LLR may be set to the maximum value. Various well-known methods may be used for the calculation of the LLR, and detailed descriptions thereof are omitted.

The results of the likelihood calculation units 38 and 52 are input to the deinterleaving units 39 and 53, and after the reverse rearrangement with the interleaving units 12 and of the transmission device is performed, the error correction units 40 and 54 perform error correction decoding. Thereby, the UL and the LL are reproduced by the reception device.

Through the above processing, information codes of a UL and an LL may be simultaneously transmitted when the CNR is satisfactory. In addition, when the CNR is not very satisfactory, the UL information code may be transmitted. Therefore, data transmission of the quasi-synchronous LDM system as proposed in Non-Patent Document 2 may be realized, and transition, for example, from 2K broadcasting to 4K broadcasting as next-generation terrestrial broadcasting may be smoothly performed.

As described above, in the data transmission system of the present example, the transmission device is configured to generate a modulated signal of a UL using IFFT processing of $N_{UL}$ points, and generate a modulated signal of an LL using IFFT processing of $N_{LL}$ points different from the $N_{UL}$ points, and transmit a signal obtained by time-adjusting the modulated signals such that start timings of the modulated signals coincide with each other in a predetermined cycle, and combining the time-adjusted signals in a predetermined power ratio. In addition, the reception device is configured to perform FFT processing of $N_{UL}$ points on the signal received from the transmission device, and based on the result, reproduce the UL while generating a UL reception replica, perform FFT processing of $N_{LL}$ points on a signal obtained by subtracting the UL reception replica from the reception signal, and reproduce the LL based on the result.

In this way, the reception device having received the UL and LL data multiplexed in the quasi-synchronous LDM method from the transmission device first performs FFT processing of a predetermined number of points for the UL, which has a higher power ratio, on the reception signal to reproduce the UL while performing FFT processing of a predetermined number of points for the LL on a signal obtained by subtracting the UL reception replica from the reception signal to reproduce the LL, and thus the UL and LL data multiplexed in the quasi-synchronous LDM method by the reception device are appropriately demodulated.

In addition, in the present example, the transmission device is configured to, after performing error correction encoding processing and interleaving processing on the UL, and intra-symbol error correction encoding processing on the result of the interleaving processing, perform IFFT processing of $N_{UL}$ points to generate a modulated signal of the UL, combine the modulated signal of the UL with a modulated signal of the LL generated in the same manner as the modulated signal of the UL, and transmit the combined signal. Further, the reception device is configured to, based on a result of FFT processing of $N_{UL}$ points on the received signal, perform error correction processing and deinterleaving processing to reproduce the UL, while performing intra-symbol error correction processing and IFFT processing of $N_{UL}$ points on the received signal to generate the UL reception replica.

With such a configuration, since the UL reception replica is generated without passing through error correction processing and deinterleaving processing, the generation of the UL reception replica may be achieved with a low delay in the reception device. In addition, in generating the UL reception replica, since the reception device does not need to be provided with the same interleaving unit as that of the transmission device, the reception device may be implemented with a small amount of hardware.

Further, in the present example, the transmission device is configured to estimate the transmission path characteristics between the transmission device and the reception device using the result of intra-symbol error correction processing and, using the estimated transmission path characteristics, generate the UL reception replica. With such a configuration, since the amount of known signals that may be used for estimating the transmission path characteristics is increased, the transmission path characteristics may be estimated with higher precision. Also, since the estimated transmission path characteristics are used to reproduce the UL and the LL, the UL and the LL may be more accurately reproduced.

In addition, in the present example, the reception device is configured to estimate the transmission path characteristics using the $N_{UL}$ points, and use a rate-conversion result of the estimated path characteristics based on the $N_{LL}$ points to reproduce the LL. With such a configuration, there is no need to insert a pilot into the LL signal.

In addition, in the present example, the reception device is configured to allocate the result of the intra-symbol error correction encoding processing to an AC carrier, which is provided as a spare carrier in the frequency domain for UL and LL transmission, or to an extended region added to at least one side frequency band of the frequency domain. With such a configuration, the result of the intra-symbol error correction encoding processing may be allocated while complying with a predetermined standard.

In the above description, two types of data are transmitted using two layers, that is, a UL and a LL, but the description may apply to a data transmission system in quasi-synchronous LDM for transmitting three or more types of data using three or more layers, respectively. For example, in the case of transmitting three types of data using three layers having differences in power, the present invention may be applicable to at least one of the relationship between the first and second layers or the relationship between the second and third layers.

Although the present invention has been described in detail above on the basis of appropriate embodiments thereof, the present invention is not limited to the specific embodiments, and some of the above-described embodiments may be suitably combined.

The present invention can be provided, for example, as a method or scheme for executing the above processing, a program for realizing the method or scheme, a storage medium for storing the program, and the like.

This application claims priority to and the benefit of Japanese Patent Application No. 2019-1095635, filed on May 22, 2019, the disclosure of which is incorporated herein by reference in its entirety.

INDUSTRIAL APPLICABILITY

The present invention can be used in a data transmission system for multiplexing a plurality of pieces of data in a layered division multiplexing (LDM) method and transmitting multiplexed data.

DESCRIPTION OF REFERENCE NUMERALS

11: error correction encoding unit, 12: interleaving unit, 13: intra-symbol error correction encoding unit, 14: mapping unit, 15: IFFT unit, 16: error correction encoding unit, 17: interleaving unit, 18: intra-symbol error correction encoding unit, 19: mapping unit, $N_{LL}$ point IFFT unit: 20, 21: adding unit, 22: D/A conversion unit, 23: transmission antenna, 31: reception antenna, 32: A/D conversion unit, 33: $N_{UL}$ point FFT unit, 34: transmission path estimation unit 35: equalizing unit, 36: decision unit, 37: intra-symbol error correction unit, 38: likelihood calculation unit, 39: deinterleaving unit, 40: error correction unit, 41: mapping unit, 42: division unit, 43: filter unit, 44: $N_{UL}$ point IFFT unit, 45: UL reception replica generation unit, 46: LL extraction unit, 47: $N_{LL}$ point FFT unit, 48: transmission path estimation unit, 49: equalizing unit, 50: decision unit, 51: intra-symbol error correction unit, 52: likelihood calculation unit, 53: deinterleaving unit, 54: error correction unit

The invention claimed is:

1. A data transmission system for multiplexing a plurality of pieces of data in a layered division multiplexing (LDM) method and transmitting multiplexed data, the data transmission system comprising:
   a transmission device configured to generate a modulated signal of first data using Inverse Fast Fourier Transform (IFFT) processing of a first number of points, generate a modulated signal of second data using IFFT processing of a second number of points different from the first number of points, and transmit a composite of these modulated signals which are adjusted in timing so that their start timings match at a predetermined cycle; and
   a reception device configured to perform Fast Fourier Transform (FFT) processing of the first number of points on the signal received from the transmission device, reproduce the first data based on a result of the FFT processing while generating a reception replica of the modulated signal of the first data, perform FFT processing of the second number of points on a signal obtained by subtracting the reception replica from the received signal, and reproduce the second data based on a result of the FFT processing.

2. The data transmission system of claim 1, wherein the transmission device performs first error correction encoding processing and interleaving processing on the first data, performs second error correction encoding processing on a result of the interleaving processing, and then performs the IFFT processing of the first number of points to generate the modulated signal of the first data; and the reception device performs first error correction processing corresponding to the first error correction encoding processing and deinterleaving processing corresponding to the interleaving processing based on a result of the FFT processing of the first number of points to reproduce the first data, while performing second error correction processing corresponding to the second error correction encoding processing and IFFT processing of the first number of points based on the result of the FFT processing of the first number of points to generate the reception replica.

3. The data transmission system of claim 2, wherein the reception device estimates a transmission path characteristic between the transmission device and the reception device using a result of the second error correction processing and generates the reception replica using the estimated transmission path characteristic.

4. The data transmission system of claim 3, wherein the reception device reproduces at least one of the first data or the second data using the estimated transmission path characteristic.

5. The data transmission system of claim 3, wherein the reception device estimates the transmission path characteristic from the first number of points, rate-converts the estimated transmission path characteristic, and reproduces the second data based on the second number of points by using the rate-converted transmission path characteristic.

6. The data transmission system of claim 2, wherein the transmission device allocates a result of the second error correction encoding processing to an auxiliary channel (AC) carrier provided as a spare carrier in a frequency domain for transmission of the first data and the second data, or to an extended area added to at least one side frequency band of the frequency domain.

7. A reception device used in a data transmission system for multiplexing a plurality of pieces of data in a layered division multiplexing (LDM) method and transmitting multiplexed data, the reception device configured to:

receive, from a transmission device, a composite of a modulated signal of first data generated using Inverse Fast Fourier Transform (IFFT) processing of a first number of points and a modulated signal of second data generated using IFFT processing of a second number of points different from the first number of points, the modulated signals of first data and second data being adjusted in timing so that their start timings match at a predetermined cycle;

perform Fast Fourier Transform (FFT) processing of the first number of points on the received signal;

reproduce the first data based on a result of the FFT processing while generating a reception replica of the modulated signal of the first data;

perform FFT processing of the second number of points on a signal obtained by subtracting the reception replica from the received signal; and reproduce the second data based on a result of the FFT processing.

8. A data transmission method of multiplexing a plurality of pieces of data in a layered division multiplexing (LDM) method and transmitting multiplexed data, the data transmission method comprising:

by a transmission device, generating a modulated signal of first data using Inverse Fast Fourier Transform (IFFT) processing of a first number of points, generating a modulated signal of second data using IFFT processing of a second number of points different from the first number of points, and transmitting a composite of these modulated signals which are adjusted in timing so that their start timings match at a predetermined cycle; and by a reception device, performing Fast Fourier Transform (FFT) processing of the first number of points on the signal received from the transmission device, reproducing the first data based on a result of the FFT processing while generating a reception replica of the modulated signal of the first data, performing FFT processing of the second number of points on a signal obtained by subtracting the reception replica from the received signal, and reproducing the second data based on a result of the FFT processing.

\* \* \* \* \*